(12) United States Patent
Bober

(10) Patent No.: US 7,321,696 B2
(45) Date of Patent: Jan. 22, 2008

(54) METHOD FOR EFFICIENT CODING OF SHAPE DESCRIPTOR PARAMETERS

(75) Inventor: Miroslaw Bober, Guildford (GB)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/761,070

(22) Filed: Jun. 11, 2007

(65) Prior Publication Data
US 2007/0230831 A1 Oct. 4, 2007

Related U.S. Application Data

(62) Division of application No. 10/203,478, filed as application No. PCT/GB01/00835 on Feb. 27, 2001, now Pat. No. 7,245,777.

(30) Foreign Application Priority Data
Feb. 29, 2000 (GB) ................................ 0004859.5

(51) Int. Cl.
*G06K 9/36* (2006.01)
(52) U.S. Cl. ...................................... 382/243; 382/251
(58) Field of Classification Search ................ 382/243, 382/251, 293, 305, 199, 195; 358/403; 375/240.08, 375/240.11, 240.12

See application file for complete search history.

(56) References Cited

U.S. PATENT DOCUMENTS

| | | | |
|---|---|---|---|
| 5,740,281 A | 4/1998 | Hirai | 382/243 |
| 6,307,964 B1 * | 10/2001 | Lin et al. | 382/203 |
| 6,400,846 B1 * | 6/2002 | Lin et al. | 382/199 |

FOREIGN PATENT DOCUMENTS

| | | |
|---|---|---|
| EP | 0 562 672 A | 9/1993 |
| GB | 2 351 826 A | 1/2001 |

OTHER PUBLICATIONS

Abbasi et al., Multimedia Systems, vol. 7, pp. 467-475, No. 6 (1999).
F Mokhtarian et al , "Robust and Efficient Shape Indexing Through Curvature Scale Space," Proc. British Machine Vision Conference, pp. 53-62, Edinburgh, UK 1996.
F. Mokhtarian et al., "Indexing and Image Database by Shape Content using Curvature Scale Space," Proc. IEE Colloquium on Intelligent Databases, London 1996.

* cited by examiner

Primary Examiner—Anh Hong Do
(74) Attorney, Agent, or Firm—Birch, Stewart, Kolasch & Birch, LLP

(57) ABSTRACT

A method of representing an object appearing in a still or video image, by processing signals corresponding to the image, comprises deriving a plurality of sets of co-ordinate values representing the shape of the object and quantizing the co-ordinate values to derive a coded representation of the shape, and further comprises quantizing a first co-ordinate value over a first quantization range and quantizing a smaller co-ordinate value over a smaller range.

7 Claims, 3 Drawing Sheets

METHOD FOR EFFICIENT CODING OF SHAPE DESCRIPTOR PARAMETERS

This application is a Divisional of application Ser. No. 10/203,478 filed on Oct. 11, 2002, now U.S. Pat. No. 7,245,777, and for which priority is claimed under 35 U.S.C. § 120; and this application claims priority on International Application No. PCT/GB01/00835 filed on Feb. 27, 2001 under 35 U.S.C. § 119; the entire contents of all are hereby incorporated by reference.

The present invention relates to the representation of an object appearing, for example, in a still or video image, such as an image stored in a multimedia database, and particularly to the coding of such a representation.

In applications such as image or video libraries, it is desirable to have an efficient representation and storage of the outline or shape of objects or parts of objects appearing in still or video images. A known technique for shape-based indexing and retrieval uses Curvature Scale Space (CSS) representation. Details of the CSS representation can be found in the papers "Robust and Efficient Shape Indexing through Curvature Scale Space" Proc. British Machine Vision conference, pp 53-62, Edinburgh, UK, 1996 and "Indexing an Image Database by Shape Content using Curvature Scale Space" Proc. IEE Colloquium on Intelligent Databases, London 1996, both by F. Mokhtarian, S. Abbasi and J. Kittler, the contents of which are incorporated herein by reference.

The CSS representation uses a curvature function for the outline of the object, starting from an arbitrary point on the outline. The curvature function is studied as the outline shape is evolved by a series of deformations which smooth the shape. More specifically, the zero crossings of the derivative of the curvature function convolved with a family of Gaussian filters are computed. The zero crossings are plotted on a graph, known as the Curvature Scale Space, where the x-axis is the normalised arc-length of the curve and the y-axis is the evolution parameter, specifically, the parameter of the filter applied. The plots on the graph form loops characteristic of the outline. Each convex or concave part of the object outline corresponds to a loop in the CSS image. The co-ordinates of the peaks of the most prominent loops in the CSS image are used as a representation of the outline.

To search for objects in images stored in a database matching the shape of an input object, the CSS representation of an input shape is calculated. The similarity between an input shape and stored shapes is determined by comparing the position and height of the peaks in the respective CSS images using a matching algorithm.

The number of bits required to express the properties of the contour shape in a descriptor should be as small as possible to facilitate efficient storage and transmission.

Aspects of the present invention are set out in the accompanying claims.

The invention can offer a very compact representation (in terms of number of bits used for storage) without any significant deterioration in retrieval performance.

Embodiments of the present invention will be described with reference to the accompanying drawings of which:

Figure 1:
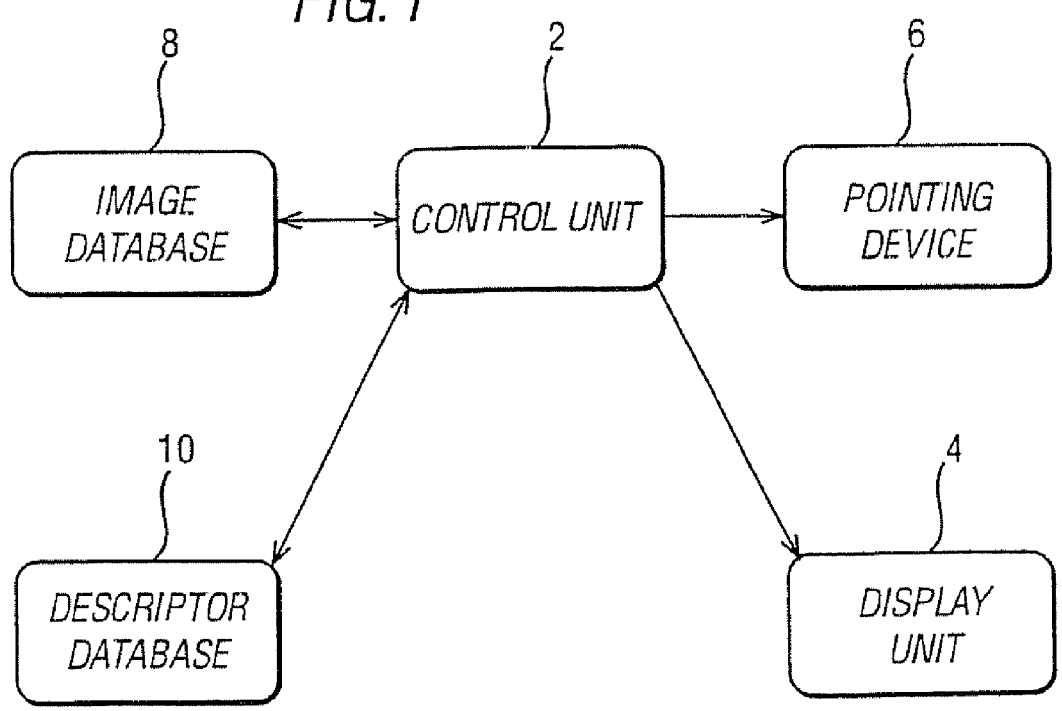
FIG. 1 is a block diagram of a video database system.

FIG. 1 shows a computerised video database system according to an embodiment of the invention. The system includes a control unit 2 in the form of a computer, a display unit 4 in the form of a monitor, a pointing device 6 in the form of a mouse, an image database 8 including stored still and video images and a descriptor database 10 storing descriptors of objects or parts of objects appearing in images stored in the image database 8.

A descriptor for the shape of each object of interest appearing in an image in the image database is derived by the control unit 2 and stored in the descriptor database 10. The control unit 2 derives the descriptors operating under the control of a suitable program implementing a method as described below.

Firstly, for a given object outline, a CSS representation of the outline is derived. This is done using the known method as described in one of the papers mentioned above.

More specifically, the outline is expressed by a representation $\Psi = \{(x(u), y(u), u \in [0, 1]\}$ where u is a normalised arc length parameter and (x,y) are co-ordinates of the points on the object contour.

The outline is smoothed by convolving $\Psi$ with Gaussian kernel $g(u, \sigma)$ or similar kernel, and the curvature zero crossings of the evolving curve are examined as $\sigma$ changes. The zero crossing are identified using the following expression for the curvature:

$$k(u, \sigma) = \frac{X_u(u, \sigma)Y_{uu}(u, \sigma) - X_{uu}(u, \sigma)Y_u(u, \sigma)}{(X_u(u, \sigma)^2 + Y_u(u, \sigma)^2)^{3/2}}$$

where $X(u,\sigma)=x(u)*g(u,\sigma)$ $Y(u,\sigma)=y(u)*g(u,\sigma)$ and $X_u(u,\sigma)=x(u)*g_u(u,\sigma)$ $X_{uu}(u,\sigma)=x(u)*g_{uu}(u,\sigma)$ In the above, * represents convolution and subscripts represent derivatives.

The number of curvature zero crossings changes as $\sigma$ changes, and when $\sigma$ is sufficiently high $\Psi$ is a convex curve with no zero crossings.

The zero crossing points (u, $\sigma$) are plotted on a graph, known as the CSS image space. This results in a plurality of curves characteristic of the original outline. The peaks of the characteristic curves are identified and the corresponding co-ordinates are extracted and stored. In general terms, this gives a set of n co-ordinate pairs [(x1,y1), (x2,y2), ... (xn,yn)], where n is the number of peaks, and xi is the arc-length position of the ith peak and yi is the peak height.

The order and position of characteristic curves and the corresponding peaks as they appear in the CSS image space depends on the starting point for the curvature function described above. The peak co-ordinates are re-ordered, as described below.

Figure 2:
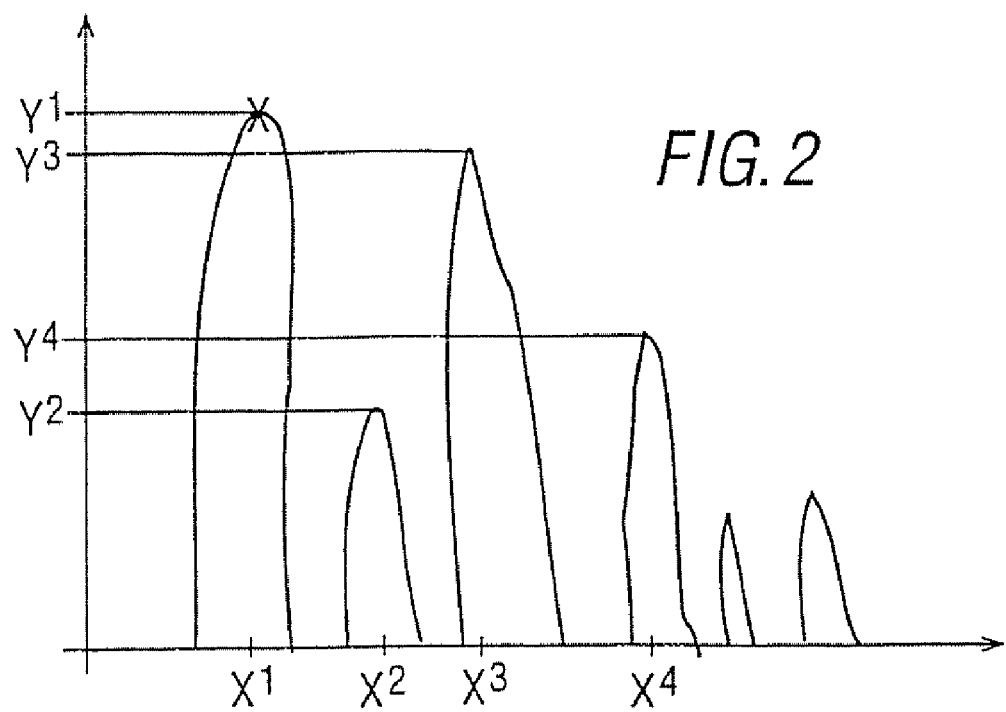
FIG. 2 is a CSS representation of an outline.

Let us assume that the contour from which parameter are extracted has n peaks, with the peak parameters forming a set $\{(x^1,y^1), (x^2,y^2), \ldots, (x^n,y^n)\}$ as shown in FIG. 2. The peaks are then ordered based on height (that is the y co-ordinate value) in either increasing or decreasing order $\{(x_1,y_1), (x_2,y_2), \ldots, (x_n, y_n)\}$ (subscripts denote the peak order number after ordering). Let us assume that peaks are ordered in decreasing order, so that the highest peak is the first one $(x_1,y_1)$, and each of the subsequent peaks is lower than or equal its predecessor in the set (FIG. 3).

These re-ordered peak co-ordinates form the basis of the descriptor for the object outline. Additional parameters of the shape, such as circularity C, eccentricity E and compactness D, some extracted from the so called "prototype contour shape" can also be computed and stored to be used in the matching process as described in co-pending application no. GB 9916684.5, the contents of which are incorporated herein by reference.

Next, coarse quantisation of the peak heights is performed. The range over which quantisation is performed is different for each peak, and depends on the values of the higher peaks (eg heights of the peaks which are predecessors in the ordered set).

Figure 3:
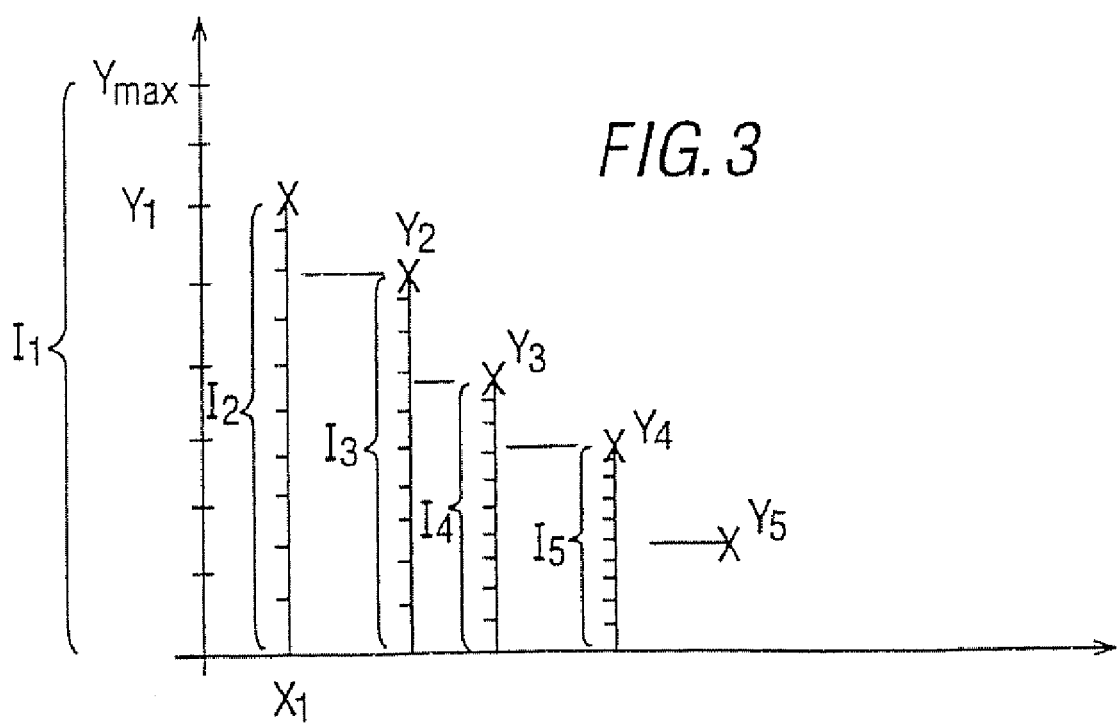
FIG. 3 is a diagram illustrating coding of co-ordinate values of the CSS representation.

Referring to FIG. 3, the first peak is quantised over a range $I1=[0,Y_{max}]$, where $Y_{max}$ is the maximum value for the peak that is expected on a certain class of shapes. Each of the remaining peaks is quantised to the range which depends on the value of one or several of the previous peaks. For example, peak $y_2$ is quantised over the interval $I2=[0,y_1]$, (FIG. 3) peak $y_3$ over the interval $[0,y_2]$ etc.

In this embodiment, the first peak is quantised over the interval [0,1024] using 7 bits and the remaining peaks are quantised to 3 bits over the appropriate respective range, as discussed above. Supposing the height of the first peak is 893, say, then $y_2$ is quantised over the range [0,893], using 3 bits, and so on. Accordingly, for peaks $y_2$ to $y_5$, the quantisation interval is reduced, giving greater accuracy despite using fewer bits. The x position of each peak are quantised to 6 bits uniformly distributed on (0,1) interval. The x value may be the original x value, as shown for example, in FIG. 2, or after shifting along the x axis by an amount such that the x value for the highest peak is at 0.

Let us examine the gain from the presented invention. In the conventional solution each peak requires two floating point numbers, 4 bytes each. Thus, for a typical shape with 9 peaks, the storage requirement is 9*2*4=72 Bytes (576 bits). After application of the proposed embodiment, the first peak requires 7 bits, assuming that the x value is treated as zero, and each consecutive peak 6+3 bits, thus 79 bits in total.

Instead of a range $[0,y_i]$, a range $[0,R(y_i))$ could be used, where $R(y_i)$ is the reconstruction of the value $y_i$ after inverse quantisation.

An alternative embodiment which will have a similar effect is to divide the height of each of the peaks {y2, y3, . . . ,yn} (except the highest one) by the value of the respective previous peak. After this operation, the range of all yi is from the set (0,1]. This allows the use of much coarser quantisation for all yi.

In either example, good results can be obtained by using 7 or 6 bit quantisation for the highest peak and 4 or 3 bit quantisation for all the remaining peaks. Other numbers of bits can be used.

Figure 4:
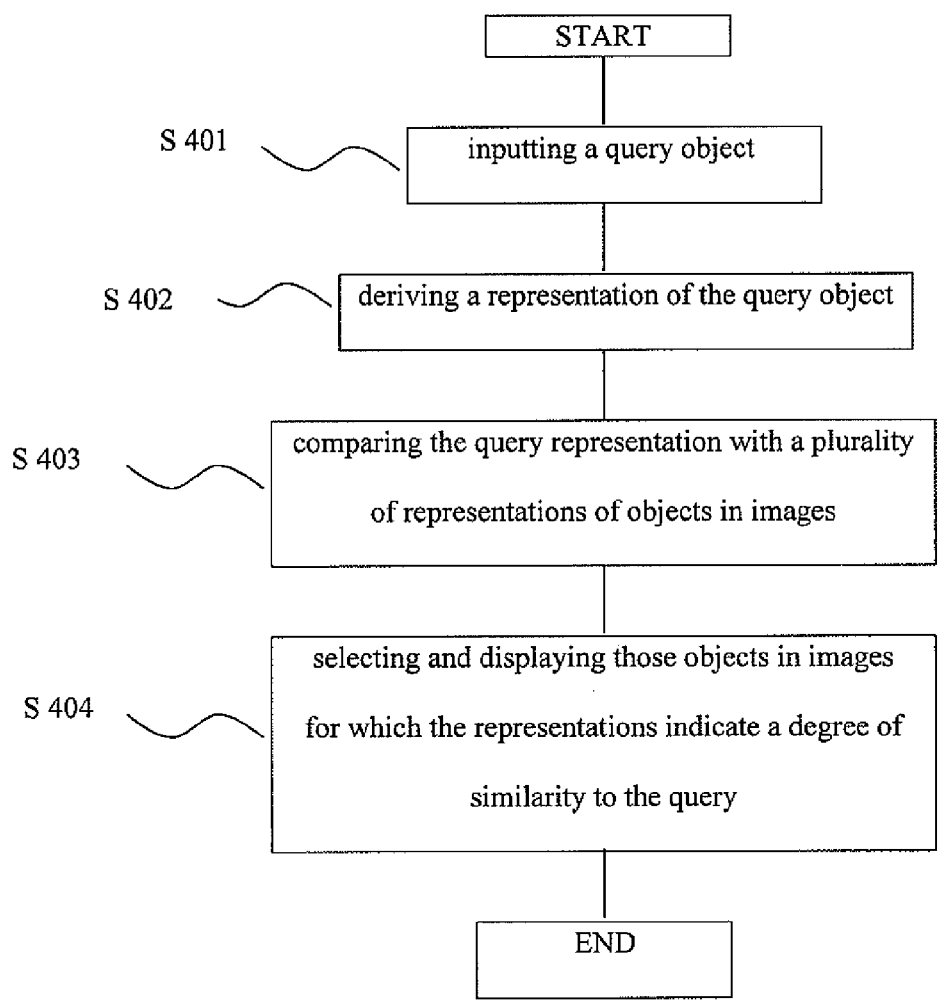
FIG. 4 is a flow diagram for searching for an object in an image in accordance with an embodiment of the invention.

FIG. 4 is a flow diagram for searching for an object in an image in accordance with an embodiment of the invention. At step S401, a query object is inputted. At step S402, a representation of the query object is derived. At step S403, the query representation is compared with a plurality of representations of objects in images and at step S404, those objects in images for which the representations indicate a degree of similarity to the query is selected and displayed in the display unit 4 as shown in FIG. 1.

The above operations can also be performed after the co-ordinate values have been subjected to a binormal filtering and a non-linear transformation, as described in co-pending application no. GB9915699.4, the contents of which are incorporated herein by reference. The x co-ordinates can be coded along the lines described above instead of or as well as the y values.

The resulting values can be stored for use, for example, in a suitable matching procedure, such as described in our co-pending applications GB9915699.4, GB9915698.6 and GB9916684.5, with appropriate modifications, for example, by performing inverse quantisation on the stored descriptors before performing matching.

The invention claimed is:

1. A method of searching for an object in an image by processing signals corresponding to images, the method comprising:
   inputting a query object;
   deriving a representation of the query object;
   comparing the query representation with a plurality of representations of objects in images; and
   selecting and displaying those objects in images for which the representations indicate a degree of similarity to the query;
   wherein the representations of objects in images are quantised co-ordinate values of peaks of a curvature scale space (CSS) representation of the shape of the object, and
   wherein the peaks of the CSS representation are ordered in decreasing order of the peak height component values and the quantisation range for a peak height component value is based on the value of the preceding peak height value.

2. The method of claim 1 wherein the query is compared with stored representations of objects in images and/or representations of objects in stored images.

3. The method of claim 1 wherein the representation of the query object and/or the representation of an object in an image to be compared is derived by the steps of:
   deriving a CSS representation of the shape of the object;
   quantising the co-ordinate values of the peaks of the CSS representation to derive a coded representation of the shape;
   ordering the peaks of the CSS representation in decreasing order of the peak height component values, wherein the quantisation range for a peak height component value is based on the value of the preceding peak height component value.

4. The method of claim 1 wherein the number of bits allocated to the quantised representation of a peak height component value is less than the number of bits allocated to the quantised representation of a preceding peak height component value.

5. An apparatus for searching for an object in an image by processing signals corresponding to images, comprising:
   a processor configured to input a query object, derive a representation of the query object, compare the query representation with a plurality of representations of objects in images, and select those objects in images for which the representations indicate a degree of similarity to the query; and
   a display for displaying those selected objects;
   wherein the representations of objects in images are quantised co-ordinate values of peaks of a curvature scale space (CSS) representation of the shape of the object, and
   wherein the peaks of the CSS representation are ordered in decreasing order of the peak height component values and the quantisation range for a peak height component value is based on the value of the preceding peak height value.

6. Apparatus of claim 5 further comprising a memory for storing images and/or representations of images.

7. A computer readable medium having stored thereon computer executable program for searching for an object in an image by processing signals corresponding to images, the computer program when executed causes a processor to execute steps of:

inputting a query object;

deriving a representation of the query object;

comparing the query representation with a plurality of representations of objects in images; and selecting and displaying those objects in images for which the representations indicate a degree of similarity to the query;

wherein the representations of objects in images are quantised co-ordinate values of peaks of a curvature scale space (CSS) representation of the shape of the object, and wherein the peaks of the CSS representation are ordered in decreasing order of the peak height component values and the quantisation range for a peak height component value is based on the value of the preceding peak height value.

* * * * *